United States Patent
Azua et al.

(10) Patent No.: US 6,718,540 B1
(45) Date of Patent: Apr. 6, 2004

(54) DATA PROCESSING SYSTEM AND METHOD FOR STORING DATA IN A COMMUNICATION NETWORK

(75) Inventors: Maria C. Azua, Austin, TX (US); Viktors Berstis, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1001 days.

(21) Appl. No.: 08/972,129

(22) Filed: Nov. 17, 1997

(51) Int. Cl.$^7$ .................................................. G06F 9/45
(52) U.S. Cl. ...................... 717/148; 717/147; 717/152; 717/153; 717/164
(58) Field of Search .................... 717/140–161

(56) References Cited

U.S. PATENT DOCUMENTS

| | | | |
|---|---|---|---|
| 4,423,414 A | 12/1983 | Bryant et al. | 340/825.07 |
| 5,202,971 A | 4/1993 | Henson et al. | 395/425 |
| 5,388,257 A | 2/1995 | Bauer | 395/600 |
| 5,668,958 A | 9/1997 | Bendert et al. | 395/308 |

FOREIGN PATENT DOCUMENTS

EP     0 770 966 A2    5/1997

OTHER PUBLICATIONS

Zhang, "Secure code Distribution", IEEE, pp. 76–79, Jun. 1997.*
Hsieh et al., "Optimizing NET Compilers for Improved Java Performance", IEEE, pp. 67–75, Jun. 1997.*
Cramer et al., "Compiling Java Just In Time", IEEE, pp. 36–43, Jun. 1997.*
Thorn, "Programming Languages for Mobile Code", ACM Computing Surveys, vol. 29, No. 3, pp. 213–239, Sep. 1997.*

* cited by examiner

*Primary Examiner*—Tuan Dam
*Assistant Examiner*—Ted T. Vo
(74) *Attorney, Agent, or Firm*—Barry S. Newberger; Winstead Sechrest & Minick P.C.; Jeffrey S. LaBaw

(57) ABSTRACT

A data processing system and method for managing the storage of compiled instructions used in interpretive programming language applications is implemented. As the applications are implemented in an interpreted programming language, the instructions are compiled into byte-codes to be used by a virtual machine and are subsequently stored in a memory. The data processing system and method recognize that a same application may be used repeatedly and periodically. Thus, the data processing system and method diminish the time required to compile the instructions of an interpretive programming language application, while preserving the compilation of interpretive programming code across sessions accessing the code. Additionally, the data processing system and method diminish the time required to download a Java application and, therefore, allow a user to more efficiently access Internet operations. To provide this functionality, the method and data processing system use a signature string that is communicated to the user of a communication network upon access of a Java application. This signature string is then used to determine whether the access Java code has been previously compiled and is currently stored within a memory of the user system. If the Java has been previously compiled and is stored in memory, the compiled code can then be used eliminating the need for recompiling and possibly downloading the application.

28 Claims, 5 Drawing Sheets

DATA PROCESSING SYSTEM AND METHOD FOR STORING DATA IN A COMMUNICATION NETWORK

TECHNICAL FIELD

The present invention relates in general to a communication network, and in particular, to storing compiled code between sessions accessing an application written in an interpreted programming language.

BACKGROUND INFORMATION

The worldwide network of computers, commonly known as the "Internet," has seen explosive growth in the last several years. This growth has been typically fueled by the introduction and widespread use of "web" browsers that allow for simple graphical user interface-based access to network servers. Such network servers typically support documents formatted as "web pages." The "World Wide Web" (www) is a collection of servers on the Internet that utilize the Hypertext Transfer Protocol (HTTP), a known application protocol that provides users access to files using a standard page description language referred to as Hyper-Text Markup Language (HTML). It should be noted that files may be provided in different formats such as text, graphics, images, sound, and video, among others. HTML provides basic document formatting and allows a developer to specify "links" to other servers and files. Use of an HTML-compliant client browser involves specification of a link via a Uniform Resource Locator, commonly known by the acronym, "URL." Upon specification of a URL, a client may make a TCP/IP (Transmission Control Protocol/Internet Protocol) request to the server identified in the link and receive a "web page" in return, where the "web page" is a document formatted according to HTML.

FIG. 1 illustrates a communication network based on a client-server model typically utilized in the Internet. Conceptually, the Internet comprises a large network of "sites" 110 that are accessible by "clients" 112. Each of the plurality of clients 112 is typically a user of a personal computer. Clients 112 access the Internet through some private Internet access provider 114 (such as Internet America™) or an on-line service provider 116 (such as America On-Line™, Prodigy, Microsoft Network™, and the like). Access provider 114 and service provider 116 will hereinafter be collectively referred to as the web servers. Furthermore, it should be noted that web servers may also be found at web sites. Alternatively, clients 112 may have a direct connection to each or a portion of the plurality of sites 110. Each of the clients 112 may run a "browser," which is a known software tool used to access the sites 110 via the web servers (114 and 116). Each site 110 selectively operates a "web site" that supports files in the form of documents and pages. A network path to a server is identified by a uniform resource locator (URL) having a known syntax for defining a network connection. As previously mentioned, URLs may be utilized to specify a link from the user to another server or file. Upon specification of a link, one of the clients 112 makes a TCP/IP request using HTTP to one of the plurality of sites 110 identified in the link and receives a web page (generally, a document formatted according to HTML) in return. In some applications, web pages may also be formatted in dynamic HTML or XML. It should be noted that in some instances, a Java application may be executed without the use of a browser. Specifically, an applet viewer that runs independently of a browser may allow a user to actually view applets and similar Java applications across the Internet without having to use a browser.

In such a communication system, Java is a programming language that is often used to program applications made available on the Internet because Java is very flexible and may be easily used on any operating system, as long as that system implements a Java virtual machine. During execution of a Java-based application, a Java program is compiled into an architecture-neutral byte format that allows the application to be interpreted on any system platform that also implements the Java virtual machine.

It should be noted that the flexibility and neutrality of Java applications results from Java's implementation as an "interpreted" language. In interpreted programming languages, a compiler typically generates byte-codes to be used by a programming virtual machine, rather than native machine code, to provide control and data necessary to execute an application. More specifically, a Java compiler typically generates byte-codes to be used by a Java Virtual Machine (JVM), rather than native machine code, to provide the control and data signals necessary to execute a Java application. As previously mentioned, Java applications may be executed on any platform to which the JVM has been ported as such byte-codes are platform-independent. An advantage of the interpreted environment is that a standard "compile" phase of program development is significantly diminished when viewed in contrast with the compile-link-run cycles required by programming languages such as C and C++.

In contrast, a disadvantage of interpreted programming languages, such as Java, is that that programming language is not executed as quickly as a compiled language, such as the C. To boost the performance of applications written in Java, many Java interpreters include "Just In Time" (JIT) compilers that are able to translate certain Java byte-code segments into machine code for a particular central processing unit at run-time. This block of compiled code (also referred to as JIT'ed code) is then stored in a storage space, referred to as a "heap." Subsequently, when the Java application is closed or terminated, the compiled code stored in the "heap" is deleted. When the Java application is accessed again, the code must be re-compiled.

Thus, the advantages from JIT compilers are not readily observable after the Java application has been exited. Therefore, a need exists for a method and apparatus to efficiently use JIT compilers to reduce an amount of time required to execute a Java application, especially between sessions in which the Java application is accessed.

SUMMARY OF THE INVENTION

The previously mentioned needs are fulfilled with the present invention. Accordingly, there is provided, in a first form, a method for operating a communication network having a user data processor. The method includes the steps of retrieving an application and computing a first signature of the application. The method also includes the steps of comparing the first signature with the second signature previously stored in the first memory of the data processor and selectively compiling the selected portion of the application to generate compiled code when the first signature does not correspond to the second signature.

Additionally, there is provided, in a second form, a data processor in a communication network. The data processor includes an input device for retrieving an application and a first memory for storing a first signature along with the compiled code. The data processor also includes a central processing unit for computing a second signature using the application. The central processing unit compares the first signature with the second signature and selectively compiles the selected portion of the application to generate compiled code when the first signature does not correspond to the second signature.

Additionally, there is provided, in a third form, a method for operating a communication network comprising a user data processor. The method includes the step of retrieving a first signature. The first signature corresponds to an application. The method also includes the steps of comparing the first signature with a second signature previously stored in a first memory of the data processor and selectively retrieving the application when the first signature does not correspond to the second signature.

As well, there is provided, in a fourth form, a computer program executable by a machine to perform method steps for operating a communication network having a user data processor. The method steps include retrieving an application and computing a first signature of the application. The method steps also include comparing the first signature with the second signature previously stored in a first memory of the data processor and selectively compiling the selected portion of the application to generate a plurality of interpreted code when the first signature does not correspond to the second signature.

Additionally, there is provided, in a sixth form, a computer program executable by a machine to perform method steps for operating a communication network having a user data processor. The method steps include retrieving a first signature. The first signature corresponds to an application. The method steps also include comparing the first signature with a second signature previously stored in a first memory of the data processor and selectively retrieving the application when the first signature does not correspond to the second signature.

These and other features, and advantages, will be more clearly understood from the following detailed description taken in conjunction with the accompanying drawings. It is important to note the drawings are not intended to represent the only form of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
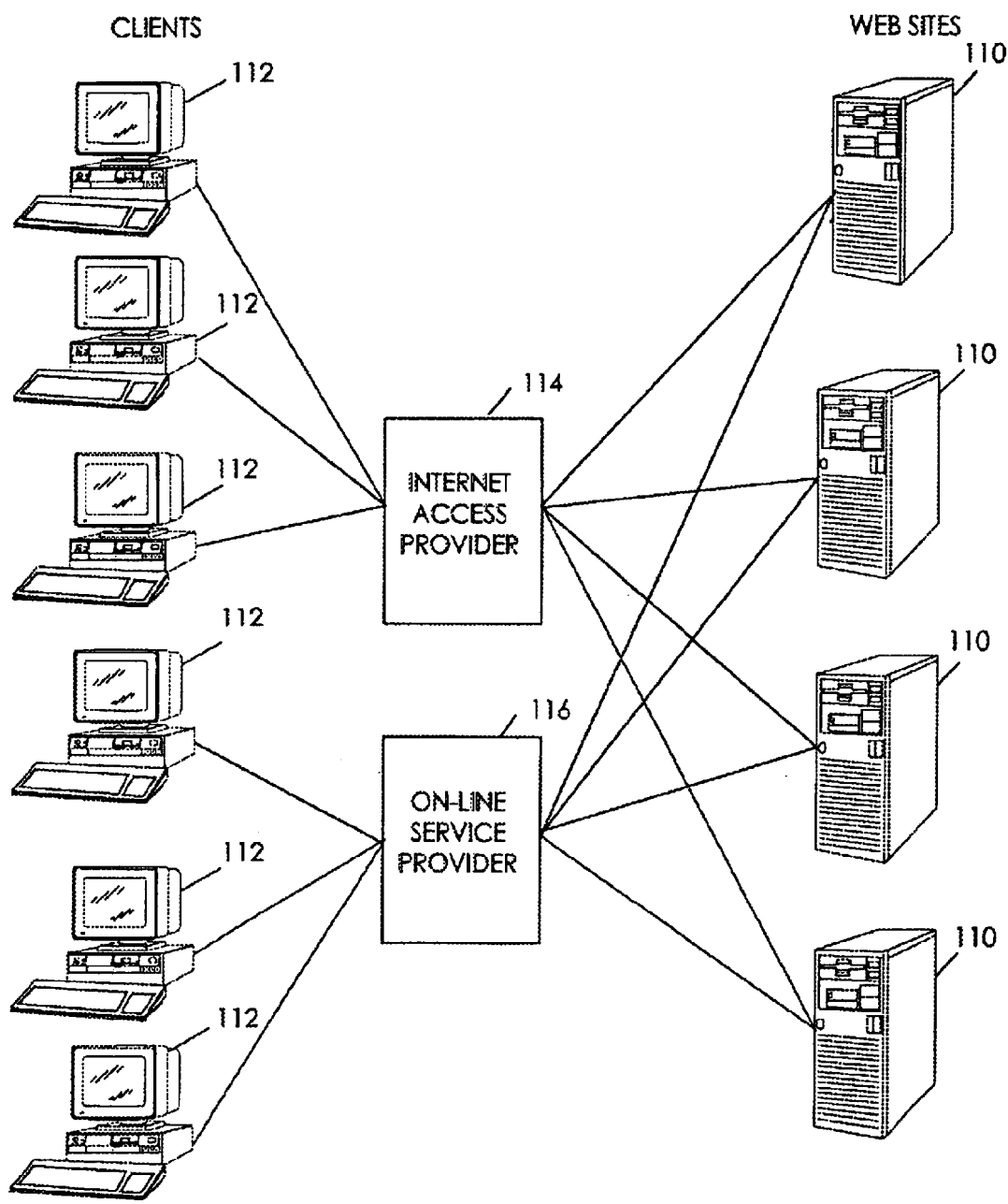
FIG. 1 illustrates, in block diagram form, a communication system implemented in accordance with one embodiment of the present invention.

The present invention implements a data processing system and method for managing the storage of instructions used in interpretive programming language applications, such as applications implemented in Java, REXX, BASIC, and the like. As the applications are implemented in an interpreted programming language, then instructions are compiled into byte-codes to be used by a virtual machine and are subsequently stored in a memory. It should be noted that in one embodiment of the present invention, the compiled instructions are stored in a "heap," wherein a heap is to an area of memory in a virtual machine that stores the byte-codes utilized during execution of an interpreted programming language application. It should be noted that the compiled instructions may also be stored in a memory that is not included within the virtual machine. Furthermore, the present invention recognizes that the memory, which may be a heap, deletes the compiled byte-code information stored therein when the application using the interpretive programming language is no longer actively executed. For example, when browser sessions are closed, byte-code information compiled during execution of Java application is discarded and the memory is rewritten with compiled code from a newly accessed Java application.

It is widely recognized that users of the Internet, as well as other communication networks, often access a same application repeatedly and periodically. Thus, the time required to compile an interpreted programming language application, such as a Java application, each time the application is accessed results in poor program execution times that may be prohibitive for many users. Thus, the present invention proposes a method and data processing system that diminish the time required to compile the instructions of an interpreted programming language application and, therefore, preserve the compilation of Java code across execution of that Java application, across browser sessions, and across sites from which the Java application may be accessed. To implement this proposed method and data processing system, the present invention proposes the use of a "signature" string that is communicated to the user of a communication network upon access of the Java application. The user may then utilize this signature to determine whether the accessed Java code has been previously compiled and is currently stored within a memory of the user system. Implementation and operation of the present invention will subsequently be described in greater detail. Prior to that description, however, an environment in which the present invention may be implemented will be provided in greater detail.

In the following description, numerous specific details are set forth to provide a thorough understanding of the present invention. However, it will be obvious to those skilled in the art that the present invention may be practiced without such specific details. In other instances, well-known devices have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Figure 2:
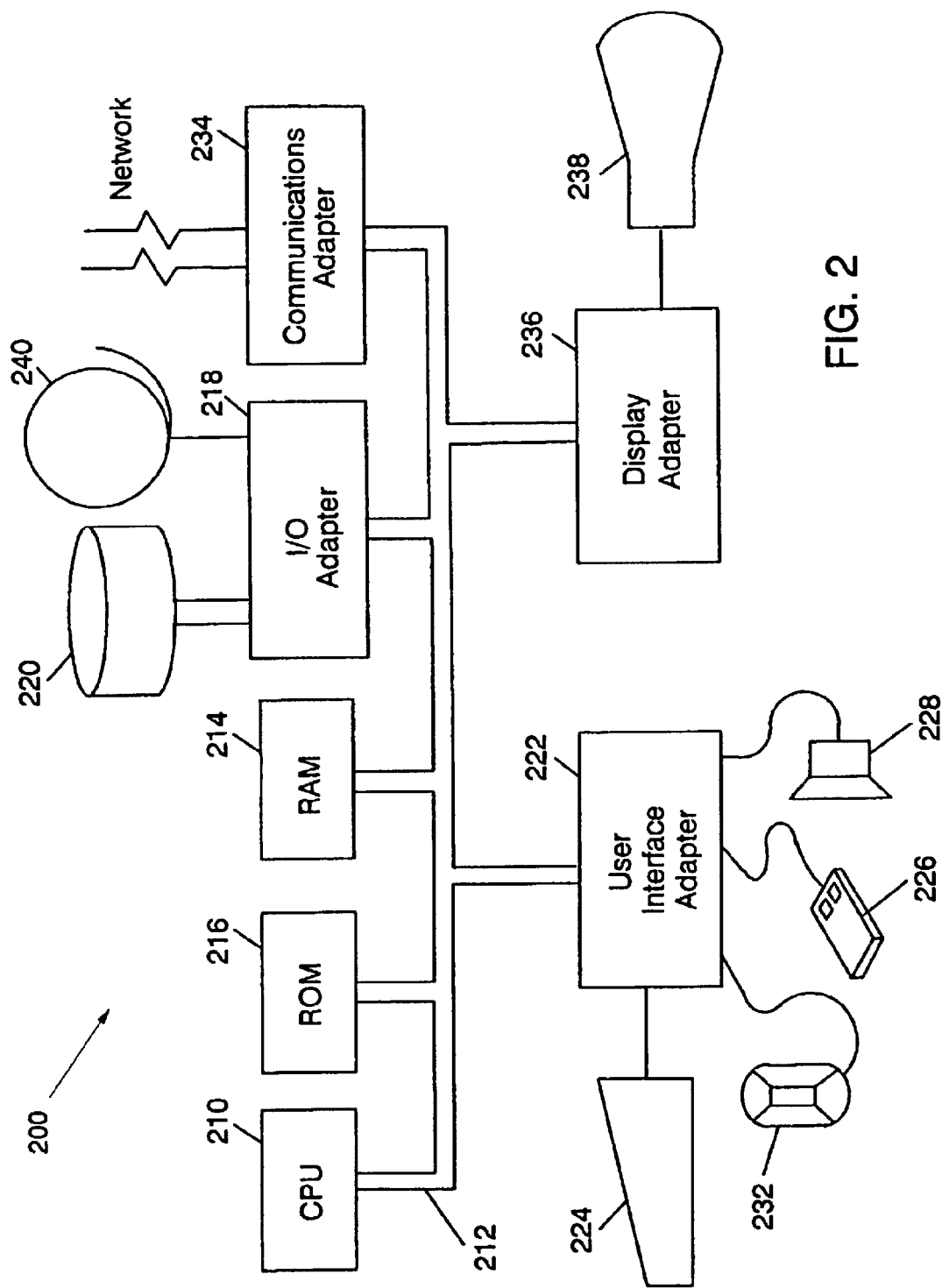
FIG. 2 illustrates, in block diagram form, a data processing system implemented in accordance with one embodiment of the present invention.

A general environment in which the communication network and methodology of the present invention may be implemented is illustrated in FIG. 1, which has been previously discussed. FIG. 2 illustrates a data processing system which may be implemented by one of web servers 114 and 116.

Referring first to FIG. 2, an example is shown of a data processing system 200 which may be used for the invention. The system has a central processing unit (CPU) 210, such as a PowerPC microprocessor ("PowerPC" is a trademark of IBM Corporation) according to "The PowerPC Architecture: A Specification for a New Family of RISC Processors", 2d Edition, 1994, Cathy May, et al. Ed., which is hereby incorporated herein by reference. A more specific implementation of a PowerPC microprocessor is described in the "PowerPC 604 RISC Microprocessor Users Manual", 1994, IBM Corporation, which is hereby incorporated herein by reference. The history buffer (not shown) of the present invention is included in CPU 210. The CPU 210 is coupled to various other components by system bus 212. Read only memory ("ROM") 216 is coupled to the system bus 212 and includes a basic input/output system ("BIOS") that controls certain basic functions of the data processing system 200. Random access memory ("RAM") 214, I/O adapter 218, and communications adapter 234 are also coupled to the system bus 212. I/O adapter 218 may be a small computer system interface ("SCSI") adapter that communicates with a disk storage device 220. Communications adapter 234 interconnects bus 212 with an outside network enabling the data processing system to communication with other such systems. Input/Output devices are also connected to system bus 212 via user interface adapter 222 and display adapter 236. Keyboard 224, track ball 232, mouse 226 and speaker 228 are all interconnected to bus 212 via user interface adapter 222. Display monitor 238 is connected to system bus 212 by display adapter 236. In this manner, a user is capable of inputting to the system throughout the keyboard 224, trackball 232 or mouse 226 and receiving output from the system via speaker 228 and display 238. Additionally, an operating system such as AIX ("AIX" is a trademark of the IBM Corporation) is used to coordinate the functions of the various components shown in FIG. 2.

Preferred implementations of the invention include implementations as a computer system programmed to execute the method or methods described herein, and as a computer program product. According to the computer system implementation, sets of instructions for executing the method or methods are resident in the random access memory 214 of one or more computer systems configured generally as described above. Until required by the computer system, the set of instructions may be stored as a computer program product in another computer memory, for example, in disk drive 220 (which may include a removable memory such as an optical disk or floppy disk for eventual use in the disk drive 220). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change. While it is convenient to describe the invention in terms of instructions, symbols, characters, or the like, the reader should remember that all of these and similar terms should be associated with the appropriate physical elements.

Note that the invention describes terms such as comparing, validating, selecting or other terms that could be associated with a human operator. However, for at least a number of the operations described herein which form part of the present invention, no action by a human operator is desirable. The operations described are, in large part, machine operations processing electrical signals to generate other electrical signals.

Figure 3:
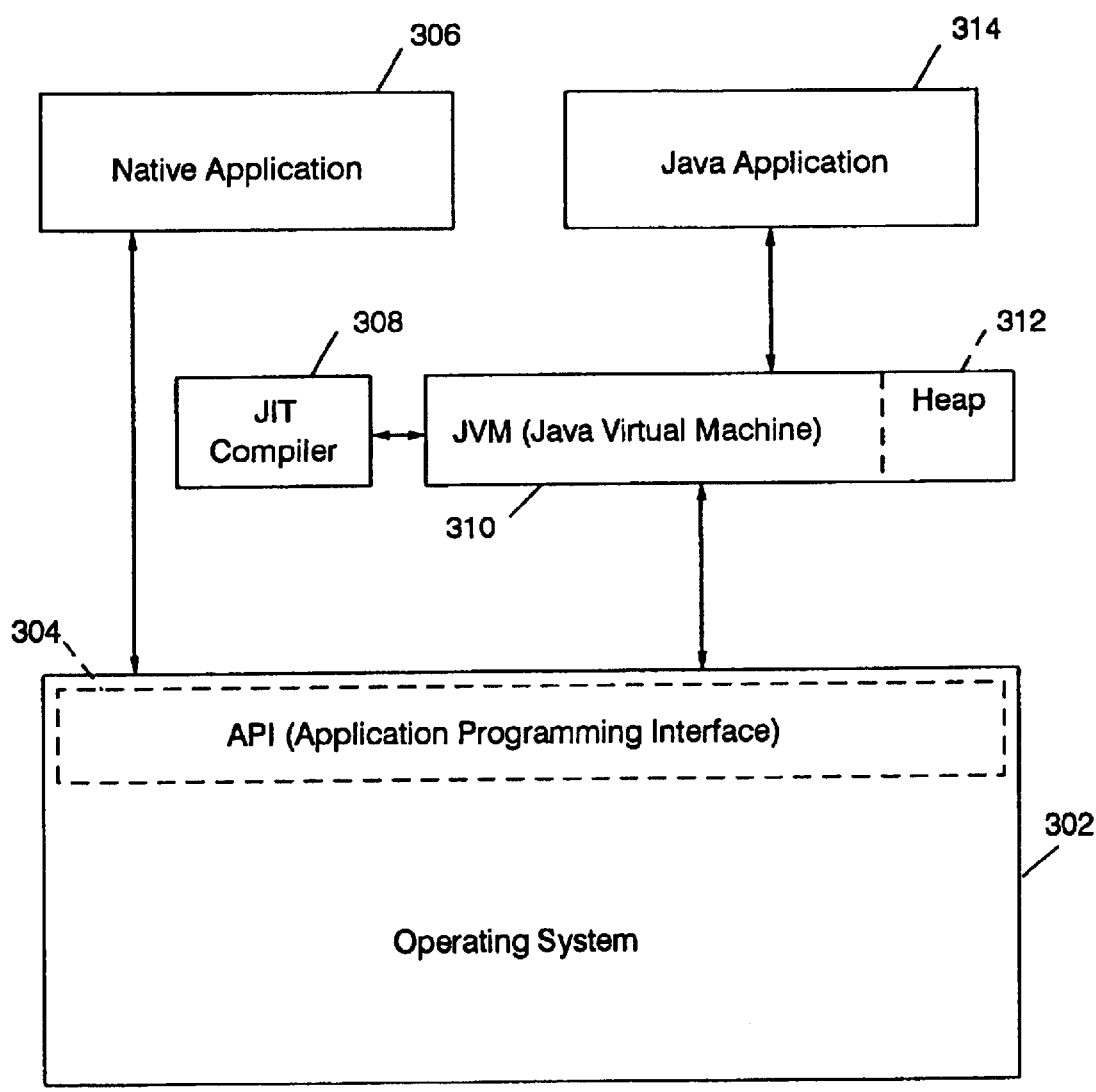
FIG. 3 illustrates, in block diagram form, an organizational view of an operating environment in accordance with one embodiment of the present invention.

FIG. 3 provides an organizational view of a operating environment for an interpretive programming language. In an example illustrated in FIG. 3, the interpreted programming language is Java. However, it should be well understood to those skilled in the art that other interpreted programming languages may be utilized, such as REXX, BASIC, SmallTalk, SNOBOL4, and the like. In this operating environment, operating system 302 is a virtual memory operating system that effectively manages memory required to execute applications therein. As a virtual memory operating system, operating system 302 typically does not have sufficient memory to manage applications to be performed therein and, therefore, must store data on an external disk or memory, such as disk drive 220 or memory space 240. Subsequently, when operating system 302 again requires the data stored in the external memory, operating system 302 retrieves that data using well-known retrieval techniques.

To describe operation of the Java operating environment illustrated in FIG. 3, an example will be provided below. In this example, assume the Java Virtual Machine (JVM) 310 uses system services provided by operating system 302 in executing a function specified in a Java applet or application. It should be noted that a Java applet is actually a program written in the Java programming language that is typically linked to a web page. To call an applet or an application, a Java programmer creates a file on a server in which the Java source code is stored. Upon creation of the file, an HTML page is created with a special tag to indicate that a browser (located on client 112) should download the file and interpret it as either a Java applet or a Java application. Typically, the Java applet or application requires that a browser implemented by client 112 provide the appropriate data and control signals to perform certain desired functions. To provide those data and control signals, JVM 310 translates the Java program into byte-codes, also referred to as API (application programming interface) calls. JVM 310 provides the API calls to API 304. API 304 subsequently translates the calls to the control and data signals that enable operating system 302 to enable components within data processing system 200 to perform desired functions.

In interpreted programming systems, JIT compiler 302 compiles portions of Java code that are repeatedly used by operating system 302. Thus, rather than merely translating codes into a byte-code format that is subsequently used by JVM 310 to generate API calls, JIT compiler 308 compiles Java program portions into native instructions utilized by a platform upon which the operating system is implemented. When the code is compiled into actual native code, the native code may execute directly with an operating system 302 and is not required to run through an interpretive programming device, such as JVM 310.

After the Java programming code is compiled by either JVM 310 or JIT 308, the code is stored in "pages" in heap 312. In alternate embodiments of the present invention, the code may be stored in a memory other than the heap within JVM 310 when it is necessary to expand the capacity of the heap. Typically, when the Java application is terminated, the pages of data stored within the memory, or the heap, are cleared. However, the present invention preserves some of the compiled code so that it survives termination of the Java application, even when successive browser sessions are used.

Furthermore, it should be noted, that although the present invention preserves some code compilations across browser sessions, across visits to different web sites, and across the opening and closing of Java applications or applets, security and corruption of data are concerns. Specifically, should a user save an old version of a Java program and that program is later modified, data generated using the older version of the Java code may result in erroneous, or corrupt, data. In response to this concern, the present invention implements a method and data processing system for preserving Java code across communication sessions, while ensuring that the compiled code is not executing old versions of a Java program or generating corrupt data. To provide this functionality, the present invention generates a signature string based upon the Java code that was originally communicated to the user (client 112). In this signature string, a portion of the data sent thereto may be used to produce a number, or signature, that uniquely corresponds to the Java program. Subsequently, the present invention utilizes the computed signatures to determine when subsequently received code corresponds to previously compiled code. The methodology used to implement the present invention will be described in greater detail with respect to FIGS. 4 and 5.

Figure 4:
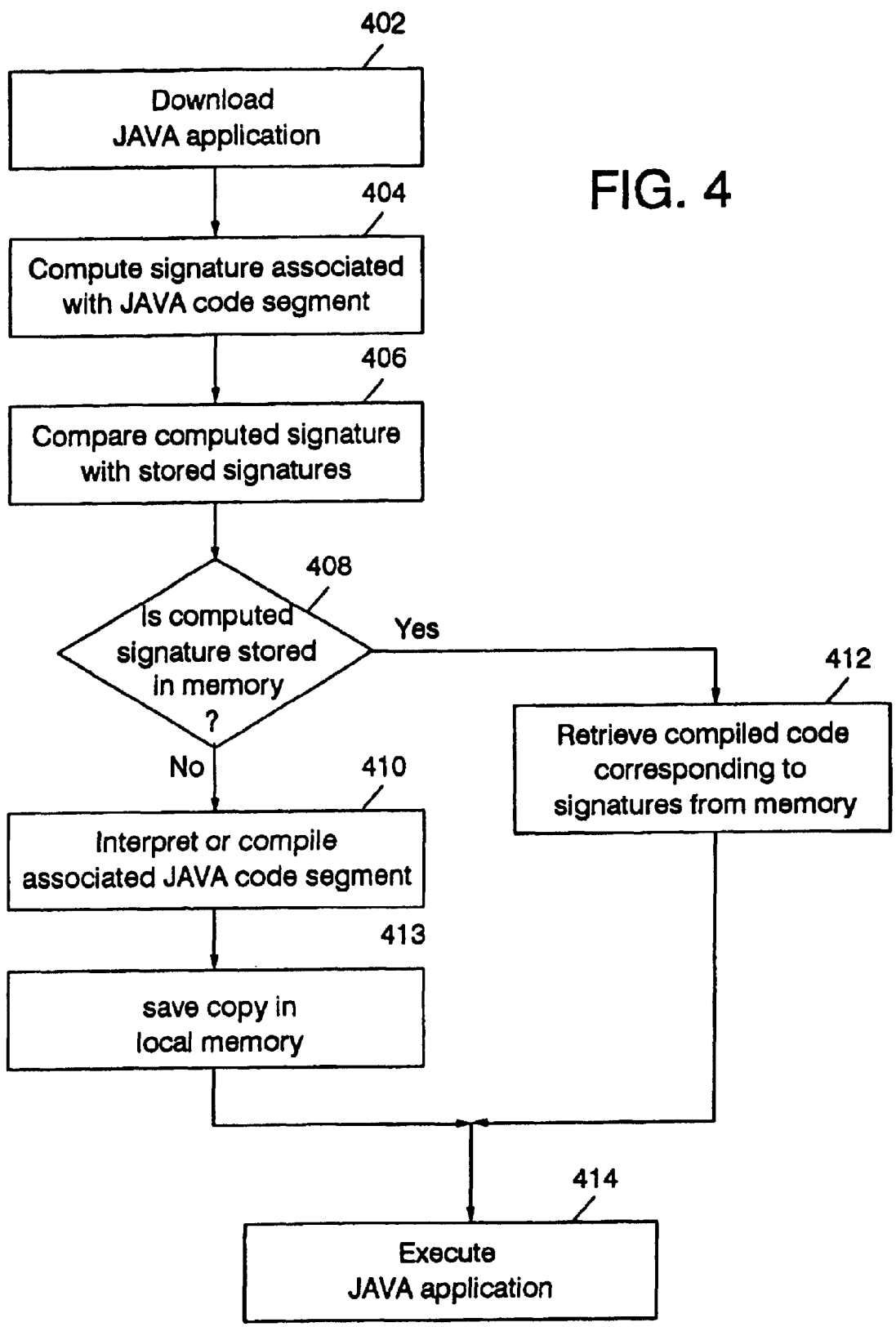
FIG. 4 illustrates, in flowchart form, an execution flow in accordance with one embodiment of the present invention.

Refer now to FIG. 4, wherein a flowchart illustrating a methodology implemented by one embodiment of the present invention is described in greater detail. In a first step 402, a Java application to be executed is downloaded from a web site (web site 110 of FIG. 1) in response to a request generated by a user (client 112 of FIG. 1). In a following discussion, it should be noted that the term client and browser may be used interchangeably, as both refer to a software application used to access a web server. As previously mentioned, when client 112 accesses a web site 110 through a server (114, 116), data is transferred from the web site to the client using a TCP/IP protocol. The data values used to compute a signature associated with a Java application or a Java code segment are included in the data transferred using the TCP/IP protocol when the Java application is retrieved. Additionally, for security, the data transferred using the TCP/IP transfer protocol may be encrypted using any number of encryption techniques.

After the data to be used in computing the signatures extracted from the input data stream by CPU 210, CPU 210 computes a signature to be associated with a Java application or Java code segment in a step 404. CPU 210 computes a signature by using a function such as that described below. It should be noted that the function described below is but one embodiment of a method for calculating a signature in the present invention. It should be noted that signature computation may also be accomplished using a number of other data processing techniques.

Thus, in one embodiment of the present invention, a plurality of data bytes are received. The data bytes may be respectively referred to as $B_0, B_1, B_2 \ldots B_M$. In some embodiments of the present invention, "filler bytes" may be added after $B_M$, such that a small change in the byte-code near $B_M$ will also result in a larger difference in the signature. Each of the plurality of data bytes are received in an input of CPU 210. Internally, CPU 210 stores a plurality of signature bytes. The signature bytes are respectively labeled $S_0, S_1, S_2 \ldots S_N$. The plurality of signature bytes are typically stored in a memory that may be written. During a first step for calculating a signature, the signature bytes are initialized to a logic 0 value. Additionally, two variables to be used during a subsequent signature calculation operation, "j" and "i" are set to a logic 0 value.

Subsequently, a next byte, $B_1$ is accessed by CPU 210. An arithmetic logic unit within CPU 210 calculates a temporary value t by using the following equation:

$$t=B_i \oplus S(j+n) \bmod (n+1)). \tag{1}$$

Next, the temporary value, t, is rotated to the left by one bit. Subsequently, a new temporary value is calculated in accordance with the following equation:

$$t=t \oplus S(j+1) \bmod (n+1)). \tag{2}$$

The new temporary value, t, is rotated to the left by one bit. Subsequently, a new temporary value is calculated in accordance with the following equation:

$$t=t \oplus S(j+7) \bmod (n+1)). \tag{3}$$

Then, a byte within the signature string is then calculated by performing a logical exclusive OR function between the new temporary value and a current value of the byte within the signature string. An equation setting forth this relationship is provided below.

$$S(j)=S(j) \oplus t. \tag{4}$$

Subsequently, the "j" value is set to be equal to:

$$j=S(j) \oplus S(j+5) \bmod (n+1)), \tag{5}$$

and the temporary value, t, is then calculated to be equal to:

$$t=j \oplus S(j+11) \bmod (n+1)). \tag{6}$$

A next signature byte to be evaluated is then set equal to tmod(n+1). Each of the aforementioned steps, with the exception of the initialization step, is again repeated to calculate each byte of the signature string. An example software program for performing the signature calculating is attached hereto in Appendix A.

In alternate embodiments of the present invention, a hash function, or an encryption technique based upon the input data may be used to compute the signature. In alternate embodiments, additional data may be used to compute the signature. Such other data may include a URL, a date, an author, a certificate (such as would identify a source), and the like. This additional information may or may not also be saved together with the signature. It should be noted that signatures are indexed for comparison using a table in one embodiment of the present invention. Next, in a step 406, CPU 210 compares the computed signature with previously generated signatures stored in a memory of data processing system 200 of client 112. The previously generated signatures may be stored in RAM 214, disk drive 220, disk drive 240, or another memory device not illustrated in FIG. 2. It should be noted that each of the previously generated signatures is computed for previously received Java applications or Java code segments in accordance with signature computation methods outlined above.

Subsequently, in a step 408, CPU 210 determines whether the computed signature corresponds to, a previously stored signature. If not, CPU 210 stores the newly computed signature within a memory space, together with the previously computed signatures. CPU 210 then enables Java operating environment 250 to interpret or compile the associated Java application or Java code segment in step 410. Specifically, CPU 210 provides the appropriate control and data signals to enable JVM 310 to interpret the associated Java application or Java code segment and to provide the resulting byte-code information to operation system 302 as API calls. Alternatively, CPU 210 may recognize that the incoming Java application or Java code segment should be compiled using JIT compiler 308. In this instance, JIT compiler 308 compiles the received Java application or Java code segment into native machine language and provides that language directly to operating system 302. The code is then saved in memory in a step 413 and indexed using its signature. Subsequently, operating system 302 executes the Java application or Java code segment in accordance with the instructions specified therein.

Alternatively, if the computed signature is stored within the memory of data processing system 200, CPU 210 provides data and control signals to retrieve the compiled code corresponding to the signatures from a memory within data processing system 200. That memory may include RAM 214, disk drive 220, and disk drive 240. As the code has previously been compiled, no compilation step is required and CPU 210 enables operating system 302 to execute the Java application or Java code segment in response to the instructions specified therein. It should be noted that compiled code that is stored within memory may be purged, as needed, in response to an algorithm implemented by CPU 210. This algorithm may be a least recently used algorithm, or the like.

Figure 5:
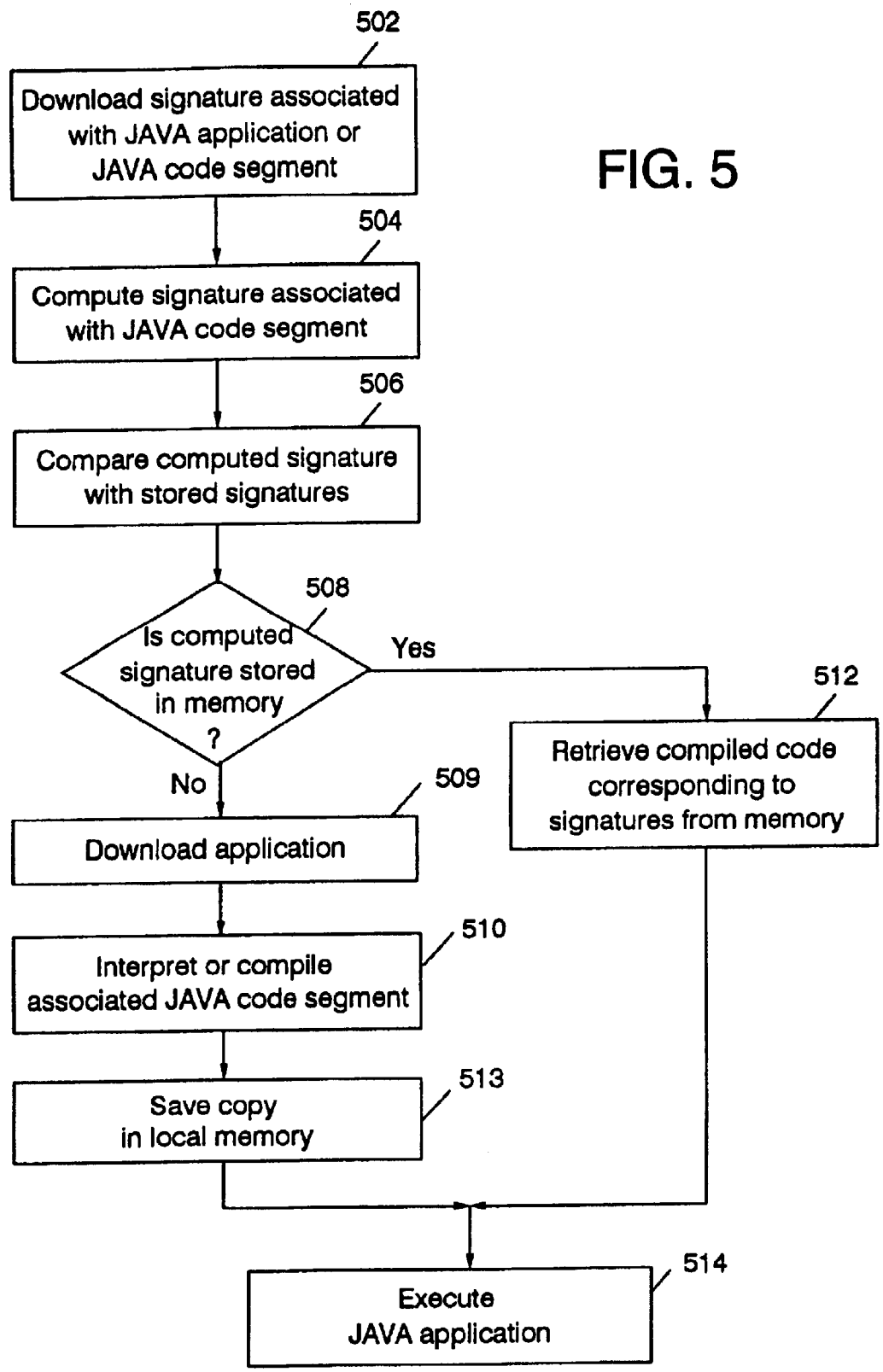
FIG. 5 illustrates, in block diagram form, an execution flow in accordance with one embodiment of the present invention.

FIG. 5 illustrates an alternate embodiment of the present invention in which the web server actually computes a signature associated with a Java application or Java code segment requested by a client (112). In one embodiment of the present invention, the server computes the signature by using a methodology such as that previously described. By using a methodology in which the signature is computed by the server and transmitted to client 112 before the transmission of the actual Java application or Java code segment, valuable transmission bandwidth and time may be eliminated as client 112 may indicate whether the Java application or Java code segment should be transferred thereto if client 112 already stores compiled code corresponding to a Java application or Java code segment.

After downloading the signature associated with the Java application or Java code segment in a step 502, a Java application to be executed is downloaded from a web site (web site 110 of FIG. 1) in response to a request generated by a user (client 112 of FIG. 1). In a following discussion, it should be noted that the term client and browser may be used interchangeably, as both are software applications used to access a web server. As previously mentioned, when client 112 accesses a web site 110 through a server (114, 116), data is transferred from the web site to the client using a TCP/IP protocol. As previously described, the data values used to compute a signature are included in the Java application or a Java code segment.

After the data to be used in computing the signatures is extracted from the input data stream by CPU 210, CPU 210 computes a signature to be associated with a Java application or Java code segment in a step 504. CPU 210 computes the signature in accordance with the previously described methodology in one embodiment of the present invention.

In alternate embodiments of the present invention, a hash function or an encryption technique based upon the input data may be used to compute the signature. Next, in a step 506, CPU 210 compares the computed signature with previously generated signatures stored in a memory of data processing system 200 of client 112. The previously generated signatures may be stored in RAM 214, disk drive 220, disk drive 240, or another memory not illustrated in FIG. 2. It should be noted that each of the previously generated signatures was computed for previously received Java applications or Java code segments in accordance with signature computation methods outlined above. Subsequently, in a step 508, CPU 210 determines whether the computed signature corresponds to a previously generated signature. If not, CPU 210 stores the newly computed signature within a memory space, together with the previously generated signatures and downloads the received applications (step 509). Furthermore, in a step 510, CPU 210 enables Java operating environment 250 to interpret or compile the associated Java application or Java code segment in an appropriate manner. Specifically, CPU 210 provides the appropriate control and data signals through operating system 302 to enable JVM 310 to interpret the associated Java application or Java code segment and to provide the resulting byte-code information to operation system 302 as API calls. Alternatively, CPU 210 may recognize that the incoming Java application or Java code segment should be compiled using JIT compiler 308. In this instance, JIT compiler 308 will compile the received Java application or Java code segment into native machine language and provide that language directly to operating system 302. The code is then saved in memory in a step 513 and indexed using its signature. Subsequently, operating system 302 executes the Java application or Java code segment in accordance with the instructions specified therein.

Alternatively, if the computed signature is stored within the memory of data processing system 200, CPU 210 provides data and control signals to retrieve the compiled code corresponding to the signatures from a memory within data processing system 200. That memory may include RAM 214, disk drive 220, and disk drive 240. As the code has previously been compiled, no compilation step is required and CPU 210 enables operating system 302 to execute the Java application or Java code segment in response to the instructions specified therein.

It should be noted that the description provided herein is but one example of an implementation of the present invention. It should be noted that many additional implementations may also be utilized to realize the present invention. Furthermore, while there have been described herein the principles of the invention, it is to be clearly understood to those skilled in the art that this description is made by way of example only and not as a limitation to the scope of the invention. Accordingly, it is intended, by the appended claims, to cover all modifications of the invention which fall within the true spirit and scope of the invention.

APPENDIX A

```
SSIZE    EQU    16                        ;Signature size
B        DB     'This is a test'          ;This would really be the java code
         DB     'string to process'
         DB     'for signature.'
         DB     0,1,2,3,4,5,6,7,8,9,10,11,12,13,14,15    ;end filler
Blength  EQU    $-B
S        DB     SSIZE DUP (0)    ;The signature is computed into here
; The algorithm:
         mov    di,0             ;(DI is j)
         mov    si,0             ;(SI is i)
         mov    ax,0             ;Initialize the AX register to zero.
loop:                            ;Do this loop for all the input bytes and
                                 ;the end filler string.
         mov    al,B[si]         ;Get the next data byte.
         inc    si               ;Increment the address.
         mov    bx,di
         add    bx,15
         and    bx,0Fh           ;Computed j+15 mod SSIZE.
         xor    al,S[bx]         ;t = B[i] xor S[j+15 mod SSIZE]
```

APPENDIX A-continued

```
rol    al,1        ;Rotate t left one bit.
mov    bx,di
add    bx,1
and    bx,0Fh      ;Computed j+1 mod SSIZE.
xor    al,S[1,x]   ;t = B[i] xor S[j+1 mod SSIZE]
rol    al,1        ;Rotate t left one bit.
mov    bx,di
add    bx,7
and    bx,0Fh      ;Computed j+7 mod SSIZE.
xor    al,S[bx]    ; t = B[i] xor S[j+7 mod SSIZE]
xor    al,S[di]    ;t = t xor S[j]
mov    S[di],al    ;S[j] = t
mov    bx,di
add    bx,5
and    bx,0Fh      ;Computed j+5 mod SSIZE.
xor    al,S[bx]
mov    di,ax       ;j = S[j] xor S[j+5 mod SSIZE]
mov    bx,di
add    bx,11
and    bx,0Fh      ;Computed j+11 mod SSIZE.
xor    al,S[bx]    ;t = j xor S[j+11 mod SSIZE]
inc    ax          ;t = t + 1
and    ax,0fh      ;t = t mod SSIZE
mov    di,ax       ;j = t
cmp    si,Blength  ;If all input bytes have not been processed,
jna    loop        ;    then do the loop again
```

What is claimed is:

1. A method for operating a communication network having a user data processor, comprising the steps of:

retrieving an application;

computing a first signature using the application;

comparing the first signature with a second signature previously stored in a first memory of the data processor; and selectively compiling a selected portion of the application to generate interpreted code when the first signature does not correspond to the second signature.

2. The method of claim 1, further comprising the step of:

selectively retrieving compiled byte-code corresponding to the application from a second memory of the data processor.

3. The method of claim 2, further comprising the step of:

executing the compiled byte-code to perform the application.

4. The method of claim 1, wherein the application is an interpreted language application.

5. The method of claim 1, wherein the application is a Java application.

6. The method of claim 1, wherein the step of computing the first signature, comprises the steps of:

retrieving a plurality of data values included within the application; and logically combining the plurality of data values in a predetermined sequence to generate the first signature.

7. A data processor in a communication network, comprising:

input means for retrieving an application;

a first memory for storing a first signature; and a central processing unit for computing a second signature using the application, wherein the central processing unit compares the first signature with the second signature and selectively compiles a selected portion of the application to generate interpreted code when the first signature does not correspond to the second signature.

8. The data processor of claim 7, further comprising:

a second memory for storing compiled byte-code corresponding to the first signature.

9. The data processor of claim 8, wherein the central processing unit selectively retrieves the compiled byte-code when the first signature corresponds to the second signature.

10. The data processor of claim 7, wherein the central processing unit executes the application.

11. The data processor of claim 7, wherein the application is an interpreted language application.

12. The data processor of claim 7, wherein the central processing unit, comprises:

means for retrieving a plurality of data values included within the application; and means for logically combining the plurality of data values in a predetermined sequence to generate the first signature.

13. A method for operating a communication network comprising a user data processor, comprising the steps of:

retrieving a first signature, wherein the first signature corresponds to an application;

comparing the first signature with a second signature previously stored in a first memory of the data processor; and selectively retrieving the application when the first signature does not correspond to the second signature.

14. The method of claim 13, further comprising the step of:

selectively retrieving compiled byte-code corresponding to the application from a second memory of the data processor when the first signature corresponds to the second signature.

15. The method of claim 14, further comprising the step of:

executing the compiled byte-code to perform the application.

16. The method of claim 13, wherein the application is an interpreted language application.

17. The data processor of claim 13, further comprising the steps of:

retrieving a plurality of data values included within the application; and logically combining the plurality of data values in a predetermined sequence to generate the first signature.

18. A computer program executable by a machine to perform method steps for operating a communication network having a user data processor, said method steps comprising:

retrieving an application;

computing a first signature using the application;

comparing the first signature with a second signature previously stored in a first memory of the data processor; and selectively compiling a selected portion of the application to generate a plurality of interpreted code when the first signature does not correspond to the second signature.

19. The computer program of claim 18, wherein said method steps further comprise:

selectively retrieving compiled byte-code corresponding to the application from a second memory of the data processor.

20. The computer program of claim 18, wherein the application is a Java application.

21. The computer program of claim 18, wherein said method steps further comprise:
- retrieving a plurality of data values included within the application; and
- logically combining the plurality of data values in a predetermined sequence to generate the first signature.

22. The computer program of claim 18, wherein the computer program is implemented on the user data processor.

23. The computer program of claim 18, wherein the computer program is implemented on a server.

24. A computer program executable by a machine to perform method steps for operating a communication network having a user data processor, said method steps comprising:
- retrieving a first signature, wherein the first signature corresponds to an application;
- comparing the first signature with a second signature previously stored in a first memory of the data processor; and
- selectively retrieving the application when the first signature does not correspond to the second signature.

25. The computer program of claim 24, wherein said method steps further comprise:
- selectively retrieving compiled byte-code corresponding to the application from a second memory of the data processor when the first signature corresponds to the second signature.

26. The computer program of claim 24, wherein said method steps further comprise:
- retrieving a plurality of data values associated with the application; and
- logically combining the plurality of data values in a predetermined sequence to generate the first signature.

27. The computer program of claim 24, wherein the computer program is implemented on the user data processor.

28. The computer program of claim 24, wherein the computer program is implemented on a server.

* * * * *

UNITED STATES PATENT AND TRADEMARK OFFICE
CERTIFICATE OF CORRECTION

PATENT NO.    : 6,718,540 B1                                    Page 1 of 1
DATED         : April 6, 2004
INVENTOR(S)   : Maria C. Azua and Viktors Berstis It is certified that error appears in the above-identified patent and that said Letters Patent is hereby corrected as shown below:

Column 8,
Line 4, please replace "$S(j+n)$" with -- $S((j+n)$ --.
Line 8, please replace "$S(j+n)$" with -- $S((j+1)$ --.
Line 12, please replace "$S(j+n)$" with -- $S((j+7)$ --.
Line 20, please replace "$S(j+n)$" with -- $S((j+5)$ --.
Line 22, please replace "$S(j+n)$" with -- $S((j+11)$ --.
Line 49, following "to" please delete ",".

Signed and Sealed this

Fourteenth Day of December, 2004

JON W. DUDAS
*Director of the United States Patent and Trademark Office*